United States Patent [19]

Amick

[11] 4,177,331
[45] Dec. 4, 1979

[54] SULFONE-CROSSLINKED POLYSTYRENE ION EXCHANGE RESIN AND PROCESS OF MANUFACTURE

[75] Inventor: David R. Amick, Chalfont, Pa.

[73] Assignee: Rohm and Haas Company, Philadelphia, Pa.

[21] Appl. No.: 927,224

[22] Filed: Jul. 24, 1978

[51] Int. Cl.$^2$ .................. C08G 75/20; C08F 8/34
[52] U.S. Cl. ........................... 521/33; 525/334; 525/337; 525/353
[58] Field of Search ............... 526/24, 30, 40; 521/33

[56] References Cited

U.S. PATENT DOCUMENTS

| 2,731,426 | 1/1956 | Lane ......................... 521/33 |
| 3,847,842 | 11/1974 | Suzuki et al. ................ 526/30 |
| 3,972,840 | 8/1976 | Suzuki et al. ................ 521/32 |

Primary Examiner—Joseph L. Schofer
Assistant Examiner—Peter F. Kulkosky
Attorney, Agent, or Firm—Louis F. Kline, Jr.

[57] ABSTRACT

Sulfone-crosslinked polystyrene cation and anion exchange resins having high solids content when saturated with water are disclosed together with a method of forming increased amounts of sulfone crosslinks using a sulfonating agent or mixture thereof preferably in combination with a boron compound.

4 Claims, No Drawings

SULFONE-CROSSLINKED POLYSTYRENE ION EXCHANGE RESIN AND PROCESS OF MANUFACTURE

This invention is directed to a novel class of crosslinked polystyrene ion exchange resin materials produced by a novel process. More specifically, this invention involves sulfone-crosslinked polystyrene ion exchange resins having a relatively high degree of crosslinking. In a preferred embodiment the invention is directed to uniformly sized beads of sulfone crosslinked polystyrene ion exchange resin produced by crosslinking and functionalization of a thermoplastic polystyrene bead of uniform size.

Ion exchange resins are today conventionally manufactured by suspension polymerization of a monomer mixture comprising a monoethylenically unsaturated monomer in large proportion and, as a crosslinker, a polyethylenically unsaturated monomer in relatively small proportion. The unfunctionalized copolymer bead resulting from the suspension polymerization is thereafter treated to introduce either a cationic or anionic ion exchange functional group by methods well known in this art. Unfortunately suspension polymerization which utilizes mechanical agitation to form the monomer droplets from which the resin beads are formed yields crosslinked copolymer particles having a wide range of particle sizes which must be separated by screening or the like in order to furnish a commercially useful product of relatively uniform size. The fines or oversize beads screened out of the product represent a substantial manufacturing loss and have little economic value.

Since suspension polymerization involves the polymerization of the monethlenically unsaturated monomer in the presence of a polyethlenically unsaturated monomer, usually the ion exchange bead (copolymer precursor) has its physical form irreversibly established as a result of the inherent parameters of suspension polymerization. Once crosslinked, such beads cannot be reused as starting materials for suspension polymerization or recycled in any useful ion exchange process. The crosslinked copolymer beads so formed are converted to ion exchange resins by, for example, sulfonating the bead (to form a strong acid cationic exchange resin) or by chloromethylation followed by amination (to form a weak or strong base anion exchange resin).

Filamentary structures containing sulfone-crosslinked aromatic units are shown in the prior art (see U.S. Pat. No. 3,972,840, issued August 3, 1976). Such materials have ion exchange capability and are produced from a filamentary linear polymer which is crosslinked by treatment with chlorosulfonic acid. This art also teaches that granular particles of polystyrene cannot be crosslinked with chlorosulfonic acid because of the high temperatures of reaction which tends to carbonize the particles. Apparently the fibrous materials, because of their large surface area, are able to reduce the heat generated by the reaction and thereby prevent carbonization.

I have now discovered a novel class of sulfone-crosslinked ion exchange resins having excellent physical stability and high capacity for ion exchange. These resins are produced by a novel route which begins with a linear polymer bead, preferably of uniform size, avoiding the requirement for later separation of off-size particles. By the method of this invention, linear polystyrene may be both crosslinked and functionalized simultaneously with a novel sulfonating reagent mixture. Alternatively if it is desired to prepare anion exchange resins, sulfonation of the polystyrene may be controlled to favor the formation of a sulfone crosslinked sulfonyl chloride intermediate which thereafter may be converted to either a weak base anion exchange resin or a strong base anion exchange resin. A preferred method for converting the sulfonyl chloride intermediate to either a weak base or a strong base resin is disclosed in copending U.S. Pat. application Ser. No. 810,340, filed June 27, 1977, by Glenn H. Beasley (commonly assigned to the assignee of this invention).

Sulfonation of linear polystyrene by the process of this invention accomplishes not only sulfone crosslinking of the polymer but yields resins that are approximately 70–85% chlorosulfonated and 15–30% sulfonated. The chlorosulfonated and sulfonated forms may be represented by the structures:

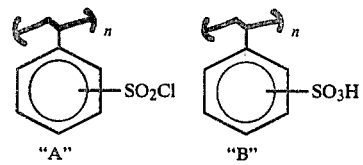

"A"  "B"

where n is the number of styrene units in the polystyrene. Conversion of the chlorosulfonated form ("A") to the sulfonic acid ("B") can be accomplished by hydrolysis (as known in the prior art) under mild conditions using for example a 4% aqueous sodium hydroxide solution. In this way the chlorosulfone group is converted to the sulfonic acid group to form a strongly acidic ion exchange resin. In a variation of the present invention one may form the sulfone crosslinks with one sulfonating reagent and thereafter sulfonate the aromatic rings with a different sulfonating reagent to form the ion exchange functional groups. In general, cation exchange groups may be formed in any of the known ways including the methods described in U.S. Pat. No. 3,972,840, which patent is hereby incorporated herein by reference.

By contrast with the teachings of the prior art, I have found that granules or beads of linear polymer may be sulfone crosslinked and functionalized with a particular sulfonating reagent mixture without carbonization or destruction of the particle integrity. The reagents useful by the process of the invention include various combinations of chlorosulfonic acid, sulfur trioxide, sulfuric acid and a boron compound such as boric acid and boron oxide. The sulfonation of aromatic compounds, either monomeric or polymeric, taught heretofore with chlorosulfonic acid or sulfur trioxide inherently lead to the formation of some sulfone linkages. However, the bulk of experimentation carried out with polystyrene heretofore has been aimed at minimizing or preventing sulfone formation to produce a water soluble product (see, for example, H. H. Roth, Industrial & Engineering Chemistry, 49 (II), 1820 (1957)). The present invention also differs from the prior art insofar as it is directed to the production of ion exchange beads, not filaments or sheets. Experimental conditions disclosed heretofore using chlorosulfonic acid or chlorosulfonic acid plus a swelling agent do not provide physically stable ion exchange beads. Ion exchange materials produced by the known methods have low exchange capacities and- /or unimpressive mechanical and chemical stabilities (see, for example, Angw. Chem., 67 786-7 1955).

The combinations of sulfonating reagents and boron compounds I have found most desirable for crosslinking aromatic linear polymers are as follows:
chlorosulfonic acid - sulfur trioxide
chlorosulfonic-sulfur trioxide - boron compound
chlorosulfonic acid -sulfuric acid - boron compound
sulfur-trioxide - sulfuric acid - boron compound If boric acid ($H_3BO_3$) or boron oxide ($B_2O_3$) is dissolved in the sulfonating reagent there results a much more physically stable bead having a lower moisture hold.

Chlorosulfonylation of polystyrene "B" (commercial grade polystyrene beads) having 40–50 mesh size with neat chlorosulfonic acid gives a product with high strong acid exchange capacity (=5.01 meq/g dry) and high solids (22.14%), but the beads are completely shattered. By diluting the chlorosulfonic acid with sulfuric acid it has been demonstrated that the percentage of solids is increased as the reaction mixture becomes concentrated in chlorosulfonic acid. However, the physical stability of the beads suffers as the chlorosulfonic acid percentage increases. The results of these tests are set forth in Table I.

TABLE I

Sulfonation of Polystyrene Beads ($ClSO_3H/H_2SO_4$)

| Polystyrene "B" Sample No. | Sulfonating Reagent $ClSO_3H:H_2SO_4$ (v/v) | % Solids* by weight | Capacity SSCC Meq/g | Description |
| --- | --- | --- | --- | --- |
| 1 | 50:50 | 4.43 | 4.57 | >95% Whole Beads |
| 2 | 75:24 | 7.58 | 4.97 | Mostly Cracked Beads |
| 3 | 88:12 | 11.68 | 5.01 | Cracked and Shattered |
| 4 | 94:6 | 14.57 | 5.01 | Completely Shattered |
| 5 | 100:0 | 22.14 | 5.01 | Completely Shattered |

*% resin solids in water-saturated resin (values of 10–50%, usually 40–50%, normally found with commercial grades of ion exchange resins).

The products resulting from the sulfonations shown above in Table I are deemed commercially unacceptable in view of the failure to achieve both high solids content and high level of whole beads with a single product. Accordingly, further tests were conducted with different sulfonating agents in order to determine if the two desired characteristics could be achieved simultaneously. Somewhat more suitable products resulted from sulfonation in mixtures of chlorosulfonic acid and sulfur trioxide, the results of which are given below in Table II.

TABLE II

| Polystyrene "B" Sample No. | Sulfonating Reagent $ClSO_3H:SO_3$ (v/v) | $SO_3$ per Aromatic Ring | % Solids[a] | SSCC[a] | % Uncracked[a] Beads |
| --- | --- | --- | --- | --- | --- |
| 6 | 75:25 | 8 | 9.46 | 5.53 | >99 |
| 7 | 88:12 | 4 | 10.31 | 5.51 | >95 |
| 8 | 94:6 | 2 | 15.66 | 5.14 | 80 |
| 9 | 97:3 | 1 | 18.73 | 3.61 | 20 |

[a]The products were hydrolyzed at 80° C. with 4% aqueous NaOH for two hours before being analyzed.

From theory it is predictable that an increase in the amount of sulfone crosslinking leads to an increase in the percent resin solids. An approach to directly increasing the number of sulfone crosslinks which seemed particularly promising was to add boron oxide ($B_2O_3$) to the reaction mixture. Sulfur trioxide is sold in a stabilized form to prevent its polymerization and $B_2O_3$ is the common stabilizer. It has been found that the proportion of sulfone-containing product resulting from sulfonation of aromatic compounds with $SO_3$ increases with increasing $B_2O_3$ concentration (British Pat. No. 893,732). Thus, a straight forward route to achieving more sulfone crosslinks is to react polystyrene beads with sulfonating agents ($SO_3$, $SO_3/H_2SO_4$, $SO_3$/$ClSO_3H$, $H_2SO_4$-$ClSO_3H$) in which additional $B_2O_3$ has been dissolved.

As the examples in the following table demonstrate, the addition of boron compounds ($B_2O_3$, $H_3BO_3$) to the sulfonating reagents does indeed afford a high level of uncracked beads with increased percent solids.

TABLE III

Sulfonation of Polystyrene Beads (Boron Stabilized)

| Polystyrene "B" Sample No. | Sulfonating Reagent | Boron Content | Product % Solids | Product Description |
| --- | --- | --- | --- | --- |
| 10 | 3:1 $ClSO_3H/SO_3$ | None | 9.1 | 99% Uncracked Beads |
| 11 | " | 2.44% $B_2O_3$ | 24.6 | 98% Uncracked Beads |
| 12 | " | 2.44% $H_3BO_3$ | 22.6 | 99% Uncracked Beads |
| 13 | 20% $SO_3/H_2SO_4$ | None | 9.0 | Highly cracked |
| 14 | " | 1.64% $B_2O_3$ | 17.2 | 95% Uncracked Beads |
| 15 | 12% $H_2SO_4/ClSO_3H$ | None | 11.7 | Cracked & Shattered |
| 16 | " | 2.44% $H_2BO_3$ | 21.5 | 95% Uncracked Beads |

The data of Table III show that the addition of a boron compound to 20% fuming sulfuric acid and to 12% $H_2SO_4$-$ClSO_3H$ resulted not only in a doubling of the percent solids but also in a more physically stable product (note product descriptions).

It is known that sulfone bridges result from the electrophilic attack of "pyrosulfonic acid" (I) intermediates upon unreacted aromatic rings; these intermediates are, in turn, formed by the reaction of a sulfonic acid with SO₃ (W. H. C. Ruegeberg, T. W. Sauls, and S. L. Norwood, J. Org. Chem., 20, 455 (1955). The addition of a boron compound apparently changes the nature of the pyrosulfonic acid (I) intermediate (possibly to a structure like II below) in a way that favors path "a" (sulfone formation) over bath "b" (see the following equations).

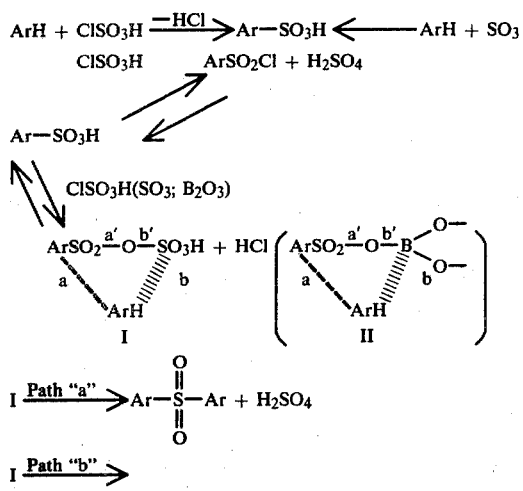

*Dashed lines a and b represent bonds being formed, while solid lines a' and b' denote bonds being broken (e.g., bond a formation is simultaneous with bond a' cleavage.

Although I do not wish to be bound to any particular theory expressed herein, the above postulated reaction scheme explains the superiority of the products when using boron as a stabilizer. The boron compound apparently alters the nature of the pyrosulfonic acid intermediates and leads to the formation of the sulfone crosslinks. Other compounds have been mentioned in the literature which might have similar effect. These have been tried and found to be ineffectual. The results are presented in the following table:

TABLE IV

Reaction of PS** Beads with 1 Equivalent of Additive in 3:1 ClSO₃H/SO₃

| No. | Additive | Product % Solids | Literature Reference |
|---|---|---|---|
| 1 | None | 9.46 | — |
| 2 | B₂O₃ | 24.61 | British Patent 893,732 |
| 3 | S₂O₅Cl₂ | 9.66 | — |
| 4 | CO₂Cl₂ | 9.90 | CA,54: 25644a |
| 5 | SO₂Cl₂ | 9.89 | Chem. & Ind.,1140 (1959) |
| 6 | SOCl₂ | 5.71 | Chem. & Ind.,1140 (1959) |
| 7 | CH₃SiCl₃ | 9.52 | U.S. Pat. No. 2,716,593 |
| 8 | (CH₃)₃ SiCl | 9.73 | U.S. Pat. No. 2,716,593 |
| 9 | P₂O₅ | 8.94 | Chem. & Ind.,1140 (1959) |
| 10 | POCl₃ | 9.40 | Chem. & Ind.,1140 (1959) |
| 11 | POCl₃* | 9.84 | Chem. & Ind.,1140 (1959) |
| 12 | PCl₃ | 9.31 | CA,52:10522e |

*The ClSO₃H—SO₃—POCl₃ reactant was heated at 80° C. for three hours and cooled to room temperature before addition of the polystyrene beads. All of the other reaction mixtures were prepared at room temperature.
**PS is polystyrene.

Weakly and strongly basic anion exchange resins are prepared from the chlorosulfonated intermediate product produced when sulfonating polystyrene (see Structure "A" above). The addition of one equivalent of NaCl to the sulfonation reagent mixture increases the proportion of chlorosulfonylated intermediate produced in the sulfonation reaction from about 79% to about 84% but leads to a decrease in resin solids content, presumably by causing a decrease in the formation of sulfone crosslinks. Other methods, such as the use of a chlorinating agent to drive the equilibrium toward the chlorosulfonylated intermediate (U.S. Pat. Ser. No. 810,340, supra) may be used to increase the number of sites which may be converted to anion exchange groups. A typical anion exchange resin may be prepared according to the following reaction:

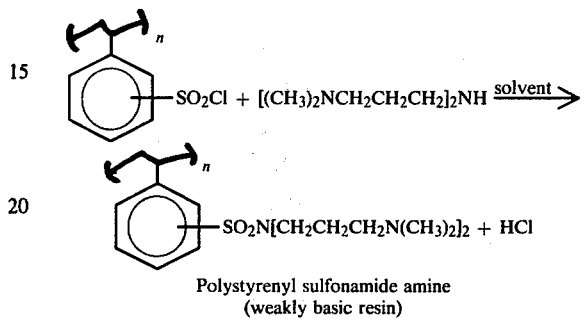

Polystyrenyl sulfonamide amine
(weakly basic resin)

The anion exchange resins exhibit a much higher percent solids than the cation counterparts produced by direct hydrolysis of the chlorosulfonylated resin (26.6% vs. 9.7% cpd. when no boron was used and 48.0% vs. 22.6% when a boron cpd. was added to the sulfonation mixture) from the sulfonation reaction mixture. Increasing the extent of chlorosulfonylation leads, after reaction with an amine, to even higher percent solids in the sulfonamide amine products.

In carrying out the process of the present invention it is normally desirable to use a large excess, for example 10–25 fold excess of sulfonating agent. Attempts to sulfonate polystyrene beads with a two-fold to five-fold excess (3:1 ClSO₃H:SO₃) have led to generally incomplete reactions and unstable products. The poor results are at least partially due to the product swelling out of the small volume of ClSO₃H/SO₃ used.

The sulfonation reaction with polystyrene beads is vigorously exothermic requiring cooling of the reaction mixture to a temperature between about 10° C. and 80° C., preferably between 20° C. and 60° C.

The following specific examples further illustrate the present invention but should not be construed as limiting the broader aspects thereof. Except where noted otherwise all percentages and ratios are by weight.

EXAMPLE I

To 26 ml of 3:1 ClSO₃H/SO₃ (v/v) was added 1.20 g of H₃BO₃. When the boric acid had dissolved and the solution had cooled to 25° C., 2 g of 40/50 mesh linear polystyrene beads were added and the reaction was stirred overnight at 25° C. (an 8 hr. reaction time is sufficient). The beads were collected by filtration on a fritted disc, added to 50 ml of sulfuric acid, slowly diluted with 125 ml of DI water, and then hydrolyzed in 4% aqueous sodium hydroxide to produce a strongly acidic resin having an SSCC of 5.47 meq/g (dry), a solids content of 22.3% and with 99% of the beads uncracked.

EXAMPLE II

To a solution of 0.8g of boron oxide in 26 ml of 20% fuming sulfuric acid at 25° C. was added 2 g of 40/50 mesh linear polystyrene beads. The temperature was increased to 60° C. and the reaction was stirred overnight. The reaction was cooled to 25° C. and worked up as in Example I to produce a strongly acidic cation resin having an SSCC of 5.78 meq/g (day), a solids content of 17.2% and with 95% of the beads uncracked.

EXAMPLE III

To a solution of 1.2 g of boric acid in 26 ml of 12% $H_2SO_4$—$ClSO_3H$ at 35° C. was added 2 g of 40/50 mesh linear polystyrene beads. The reaction was stirred overnight at 35° C., cooled to 25° C. and worked up as in Example I to produce a strongly acidic cation resin having a solids content of 21.5% and 95% of the beads uncracked.

EXAMPLE IV

To the unhydrolyzed reaction product of sulfonation of polystyrene beads produced in accordance with the foregoing Examples (using a 3:1 ratio of $ClSO_3H$ to $SO_3$) was added an excess of diethylaminopropyl amine to convert the resin to a weak base anion exchange form having a total anion exchange capacity of 1.36 and a percent solids of 26.6%.

EXAMPLE V

Following the procedure in Example IV but using a sulfonation reagent mixture containing 3:1 $ClSO_3H$/$SO_3$ plus 2.44% $H_3BO_3$ a product was obtained having a total anion exchange capacity of 1.62 and a percent solids of 48.0%

EXAMPLE VI

The product of Example V is converted to a strong base anion exchange resin by reaction with one mole of $CH_3Cl$ per mole of amine groups to quaternize the amine groups.

EXAMPLE VII

Samples of sulfone-crosslinked resins of varying mesh size produced according to the preceding examples were compared in physical stability and capacity to a standard commercial gel strong acid cation exchanger (sulfonic acid functionality) derived from a monomer mixture containing 1% divinylbenzene crosslinker. The commercial resin is generally used for the isolation and recovery of high molecular weight organic cations. The results of these tests establish the favorable performance characteristics of the invention as shown below.

Comparison of Commercial Resin ("B") with Sulfone-Crosslinked Strong Acid Resins ("A")

|  | A | | | B |
|---|---|---|---|---|
| Mesh Size | 20/30[a] | 40/50[a] | 50/60[a] | |
| % Solids | 9.5% | 9.1% | 9.0% | 8.7% |
| SSCC (H+) meq/g dry | 5.51 | 5.55 | 5.50 | 5.12 |
| CEC (H+) meq/g dry | 6.79 | 6.69 | 6.65 | 6.46 |

Appearance[b] (H+) after 100 Acid-Base Cycles (Piston Pump Test: U.S. Pat. No. 3,843,566)

-continued

|  | A | | | B |
|---|---|---|---|---|
|  | 20/30 | 40/50 | 50/60 | |
| UT | 49 | 88 | 86 | 98[c] |
| C | 50 | 9 | 10 | 2 |
| F | 1 | 3 | 4 | 0 |

Wet-Dry Stability (H+) After 1 Acid-Base Cycle

|  | A | | | B |
|---|---|---|---|---|
|  | 20/30 | 40/50 | 50/60 | |
| UT | 87 | 90 | 96 | 98[c] |
| C | 3 | 7 | 3 | 1 |
| F | 10 | 3 | 1 | 1 |

[a]Mesh size of the starting PS beads.
[b]UT = untouched beads, C = cracked beads, F = fragmented beads.
[c]50% of the commercial resin particles are irregularly shaped and not spherical.

Upon sulfonation the linear polystyrene beads tend to swell significantly, but uniformly. For example, when sulfonating linear polystyrene beads having a mesh size of $-50/+60$ the beads are observed to change to a $-20/+30$ mesh size. Similar changes are observed with other sized beads.

EXAMPLE VIII

This example illustrates recycling of styrene undersized and oversized beads prior to crosslinking.

Linear polymer beads of styrene produced by aqueous suspension polymerization of a styrene monomer mix and having a particle distribution between about $-20$ and $+60$ mesh is screened to a 40/50 mesh cut. The undersized and oversized beads comprising 30% by weight are dissolved in a fresh monomer mix being fed to the polymerization kettle. The 40/50 mesh cut is crosslinked by the method of Example I, above. Optionally, the oversized and undersized beads may be melted and extruded to form shaped particles of relatively uniform size which may then be used for any other purpose or sulfone-crosslinked as described above without having to be dissolved in monomer and repolymerized.

I claim:

1. A process for producing sulfone-crosslinked ion exchange resin beads exhibiting high solids content when saturated with water which comprises reacting linear polystyrene beads with a sulfonating reagent mixture comprising either (1) a mixture of chlorosulfonic acid and sulfur trioxide or (2) a mixture of boron oxide or boric acid
    and one or more reagents selected from sulfuric acid, chlorosulfonic acid and sulfur trioxide,
    said sulfonating reagent mixture being used in excess of stoichiometric requirements.

2. The process of claim 1 wherein the linear polystyrene beads reacted with the sulfonating reagent are of uniform size with 90% of the particles falling within a ten mesh range.

3. Sulfone-crosslinked polystyrene ion exchange resin beads produced in accordance with claim 1 and having a solids content of at least about 10% by weight when saturated with water, with at least about 80% of the beads being uncracked.

4. Sulfone-crosslinked polystyrene ion exchange resin beads produced in accordance with claim 1 and having at least about 95% of the beads uncracked.

* * * * *